(12) United States Patent
Lambert et al.

(10) Patent No.: US 7,875,830 B2
(45) Date of Patent: Jan. 25, 2011

(54) LASER MACHINE MONITORING

(75) Inventors: Martin Lambert, Korb (DE);
Juergen-Michael Weick, Asperg (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 129 days.

(21) Appl. No.: 11/695,312

(22) Filed: Apr. 2, 2007

(65) Prior Publication Data
US 2007/0291379 A1    Dec. 20, 2007

Related U.S. Application Data

(63) Continuation of application No. PCT/EP2005/010613, filed on Oct. 1, 2005.

(30) Foreign Application Priority Data

Oct. 2, 2004    (EP) ................................. 04023524

(51) Int. Cl.
B23K 26/02    (2006.01)
(52) U.S. Cl. ........................ 219/121.83; 219/121.61; 219/121.78
(58) Field of Classification Search ............ 219/121.83, 219/121.61, 121.78
See application file for complete search history.

(56) References Cited

U.S. PATENT DOCUMENTS

| 4,367,017 A |   | 1/1983  | Jimbou et al.   |         |
|-------------|---|---------|-----------------|---------|
| 4,431,267 A | * | 2/1984  | Finck et al.    | 362/191 |
| 4,498,737 A | * | 2/1985  | Doggett         | 362/191 |
| 4,499,897 A |   | 2/1985  | Roussel         |         |
| 4,684,780 A |   | 8/1987  | Cantello et al. |         |
| 4,728,771 A |   | 3/1988  | Sartorio        |         |
| 5,208,439 A |   | 5/1993  | Arai            |         |
| 5,229,572 A |   | 7/1993  | Ito             |         |
| 5,249,082 A |   | 9/1993  | Newman          |         |
| 5,584,568 A | * | 12/1996 | Corbasson et al.| 362/268 |
| 5,684,644 A | * | 11/1997 | Spears et al.   | 359/823 |
| 6,118,527 A |   | 9/2000  | Jurca           |         |
| 6,166,868 A |   | 12/2000 | Holderer et al. |         |
| 6,215,604 B1| * | 4/2001  | Hori            | 359/819 |
| 6,370,171 B1|   | 4/2002  | Horn et al.     |         |

(Continued)

FOREIGN PATENT DOCUMENTS

DE        204 320        11/1983

(Continued)

OTHER PUBLICATIONS

Translation of an Office Action from a corresponding application in China; mailed May 31, 2008, 4 pages.

(Continued)

*Primary Examiner*—M. Alexandra Elve
(74) *Attorney, Agent, or Firm*—Fish & Richardson P.C.

(57)    ABSTRACT

A laser processing machine head, a laser processing machine head monitoring system, and a method of monitoring an optical element of a laser processing machine feature a light-transmissive optical element and an optical element holder defining a cavity in which the optical element is retained against rotation. A light source mounted to the holder directs a beam of light into the optical element through a peripheral surface of the optical element. A light receiver is responsive to light from the light source reflected through the optical element. Monitoring a signal from the light receiver allows a status of the optical element to be assessed.

10 Claims, 5 Drawing Sheets

U.S. PATENT DOCUMENTS

| | | |
|---|---|---|
| 6,560,045 B1 * | 5/2003 | Schletterer .................. 359/819 |
| 6,928,100 B2 | 8/2005 | Sato et al. |
| 7,099,090 B2 * | 8/2006 | Daikoku .................... 359/719 |
| 7,162,140 B2 * | 1/2007 | Flaig ......................... 385/147 |
| 7,193,700 B2 * | 3/2007 | Fliss ........................ 356/239.2 |
| 2002/0003132 A1 | 1/2002 | Scalzotto |
| 2003/0095345 A1 | 5/2003 | Yoshida |
| 2003/0123160 A1 | 7/2003 | Zeller |
| 2004/0008342 A1 | 1/2004 | Hutt et al. |
| 2005/0279741 A1 * | 12/2005 | Arenberg et al. ....... 219/121.83 |
| 2006/0043077 A1 * | 3/2006 | Nittner et al. .......... 219/121.75 |

FOREIGN PATENT DOCUMENTS

| | | |
|---|---|---|
| DE | 19507401 | 10/1995 |
| DE | 19839930 | 9/1999 |
| EP | 0 988 916 | 8/1999 |
| EP | 1 096 415 | 5/2001 |
| EP | 1 354 664 | 4/2002 |
| EP | 1488882 | 12/2004 |
| JP | 61282808 | 12/1986 |
| JP | 62028094 U | 2/1987 |
| JP | 01-186296 | 7/1989 |
| WO | WO 98/33059 | 7/1998 |
| WO | WO 99/59762 | 11/1999 |

OTHER PUBLICATIONS

Letter to the European Patent Office (EPO) from EP Attorney Peter Riebling Representing Third Party HOL.MA Plasma & Laser Parts GmbH (dated Aug. 11, 2009), 3 pages, English summary provided in the transmittal letter.

Response letter to the EPO from EP Attorney Firm Kohler Schmid Möbus Representing Applicant Trumpf Werkzeugmaschinen GmbH & Co. KG (dated Oct. 14, 2009), 2 pages, English summary provided in the transmittal letter.

Response Letter to the EPO from EP Attorney Peter Riebling Representing Third Party HOL.MA AG Laser & Plasma Consumables (dated Feb. 2, 2010), 3 pages, Response Letter to the EPO from Kohler Schmid Möbus (dated Mar. 4, 2010), 1 page, Office Action as issued in U.S. Appl. No. 11/255,072 on May 27, 2010.

* cited by examiner

LASER MACHINE MONITORING

CROSS REFERENCE TO RELATED APPLICATION

This application is a continuation of and claims priority under 35 U.S.C. §120 to PCT/EP2005/010613, filed on Oct. 1, 2005, and designating the U.S., which claims priority under 35 U.S.C. §119 to European Patent Application No. EP20040023524.4, filed on Oct. 2, 2004. The contents of both the prior applications are hereby incorporated by reference in their entirety.

TECHNICAL FIELD

This invention relates to a laser processing machine head, a laser processing machine head monitoring system, and a method of monitoring an optical element of a laser processing machine.

BACKGROUND

Optical elements such as lenses, e.g. meniscus lenses, are normally circularly ground on the outside diameter. The lenses used in $CO_2$ lasers are additionally usually decentered. The centering error for a 7.5" lens is typically <0.1 mm after adjustment. If a lens is removed for cleaning, the position of the optical element relative to the holder is usually rotated after re-insertion due to the circular peripheral surface. The optical element must then be realigned (readjusted), since a centering from focus to nozzle better than 0.05 mm is required.

When workpieces are processed using a machine for thermal welding or cutting, in particular a laser processing machine, the cutting lenses can become contaminated. Impurities, deposits, or damage to the optics surface can result in increased absorption of the laser radiation. Consequently, the thermal loading of the optical element is increased. This ultimately results in a perceptible reduction in the laser power available in the processing region. In cases of severe contamination, in particular by spattering, the increased absorption of the laser radiation can lead to destruction of the optical element.

WO 99/59762 describes a device for checking the condition of a glass plate in a laser machining system with regard to contamination by dirt particles. The device comprises a holder for the glass plate. A temperature sensor in contact with the holder detects an increase in temperature of the holder. The increase in temperature is caused by increased absorption of radiation by the glass plate as a result of the dirt particles.

SUMMARY

Disclosed herein is a holder that simplifies insertion and alignment and reduces rotation of an optical element in a laser processing machine head, while also allowing monitoring of a status of the optical element.

In some embodiments, photocurrent from a light beam transmitted through the optical element may be assessed by a photodiode. This photodiode can subsequently be used to detect radiation intensity or radiation heat which leads to thermal loading of the optical element. The optical element may thus be monitored in a particularly advantageous manner. The reflected light beam may also be used for testing a photodiode before laser machining.

In an embodiment, a holder of an optical element includes a radiation measuring device with a light source positioned at a first position of a peripheral surface of the optical element for emitting a light beam and a sensor element positioned at a second position of the peripheral surface of the optical element for receiving the light beam reflected by a reflecting surface. An increased intensity of reflected light at the sensor element indicates an increased thermal loading of the optical element. In an embodiment, the light source is a light-emitting diode and the sensor element is a photodiode, allowing particularly simple and cost-effective monitoring of the reflected radiation.

In some embodiments, a delineated surface segment is formed on the peripheral surface of the optical element proximate a light-emitting diode. Light from the light-emitting diode can thereby be coupled more efficiently into the optical element.

In a preferred embodiment, the delineated surface segment has a ground or polished surface. The nature of the delineated surface segment is chosen to suit the intended use of the photodiode.

In some embodiments, the optical element holder includes a spring-mounted clamping body with a pressure surface for applying pressure in the radial direction to the delineated surface segment of the optical element. In particular, a contour of the pressure surface may be complementary to a contour of the delineated surface segment, allowing the optical element to be installed in the optical element holder with a mated fit.

In an embodiment, the clamping body includes a temperature sensor for measuring the temperature of the optical element. The clamping body may be in direct contact with the delineated surface segment via the pressure surface, thus allowing contact temperature measurement.

DESCRIPTION OF THE DRAWINGS

Like reference symbols in the various drawings indicate like elements.

DETAILED DESCRIPTION

Figure 1:
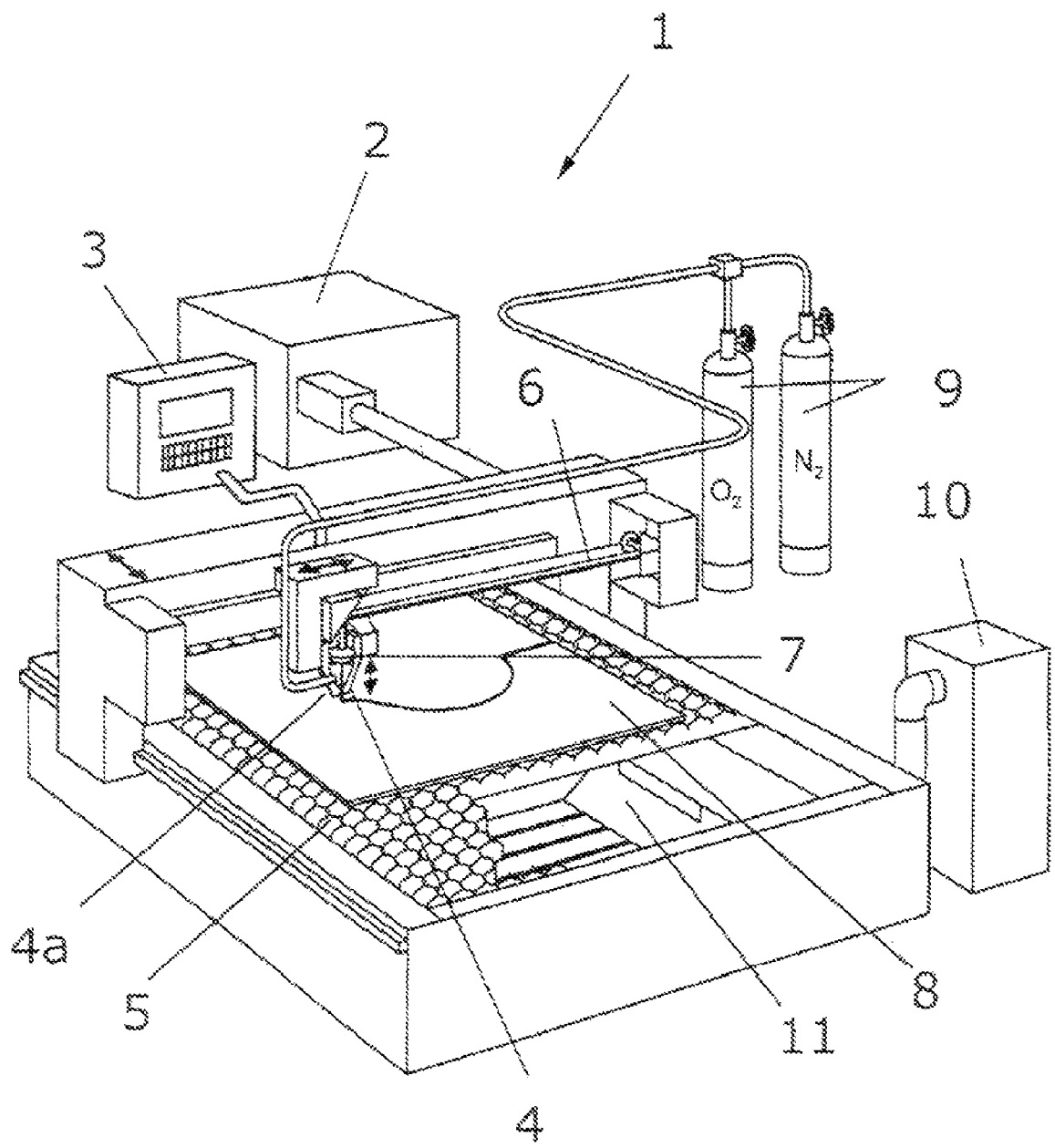
FIG. 1 shows a laser machining system.

FIG. 1 shows the structure of a laser machining system 1 for laser cutting using a $CO_2$ laser 2, a control device 3, a laser machining head 4 (nozzle 4a) and a workpiece support 5. A generated laser beam 6 is guided to the laser machining head using deflecting mirrors and is directed onto the workpiece 8 by means of a focusing lens 7.

Before a continuous flat joint is produced, the laser beam 6 must pass through the workpiece 8. Workpiece 8 may be, for instance, sheet metal. Workpiece 8 may be fused or oxidized at one location in a point. The plunge-cutting process may be effected rapidly (for instance, at full laser power) or slowly (via a so-called "ramp").

During slow plunge-cutting using a ramp, the laser power may be gradually increased, reduced, and kept constant for a certain period of time until the plunge-cut hole has been formed. Both the plunge-cutting and the laser cutting are assisted by adding a gas. Oxygen, nitrogen, compressed air and/or gases specific to the application may be used as cutting gases 9. A gas may be chosen based on materials to be cut and desired quality of the cut.

When cutting using oxygen, a maximum gas pressure of 6 bar may be used. At the point where the laser beam 6 impinges upon the workpiece 8, the material is fused and largely oxidized. The melt formed may be blown out together with the iron oxides. Particles and gases formed may be extracted from an extraction chamber 11 by means of an extraction device 10. During the oxidation process (an exothermic reaction), additional energy is released, facilitating the cutting process. For a given material thickness and laser power, significantly higher cutting speeds may be achieved with oxygen gas than with high pressure nitrogen. Alternatively, a thicker material may be cut with oxygen as the cutting gas than would be possible with nitrogen as the cutting gas.

Figure 2:
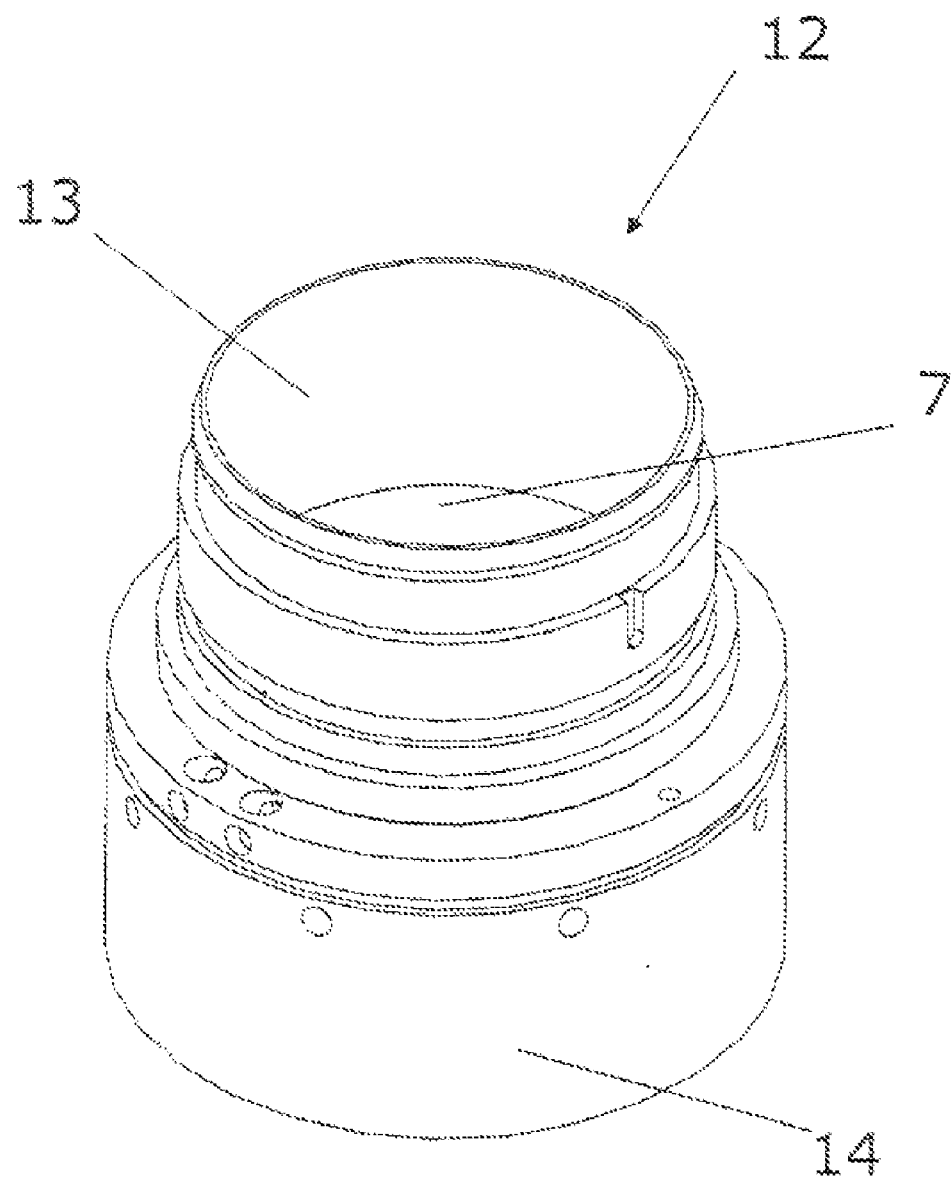
FIG. 2 is a perspective view of a holder of an optical element of the laser machining head of a laser machining system.

The holder 12 of the optical element 7 may be a cylindrical receptacle 13 and a cylindrical retaining device 14 as shown in the embodiment depicted in FIG. 2.

Figure 3:
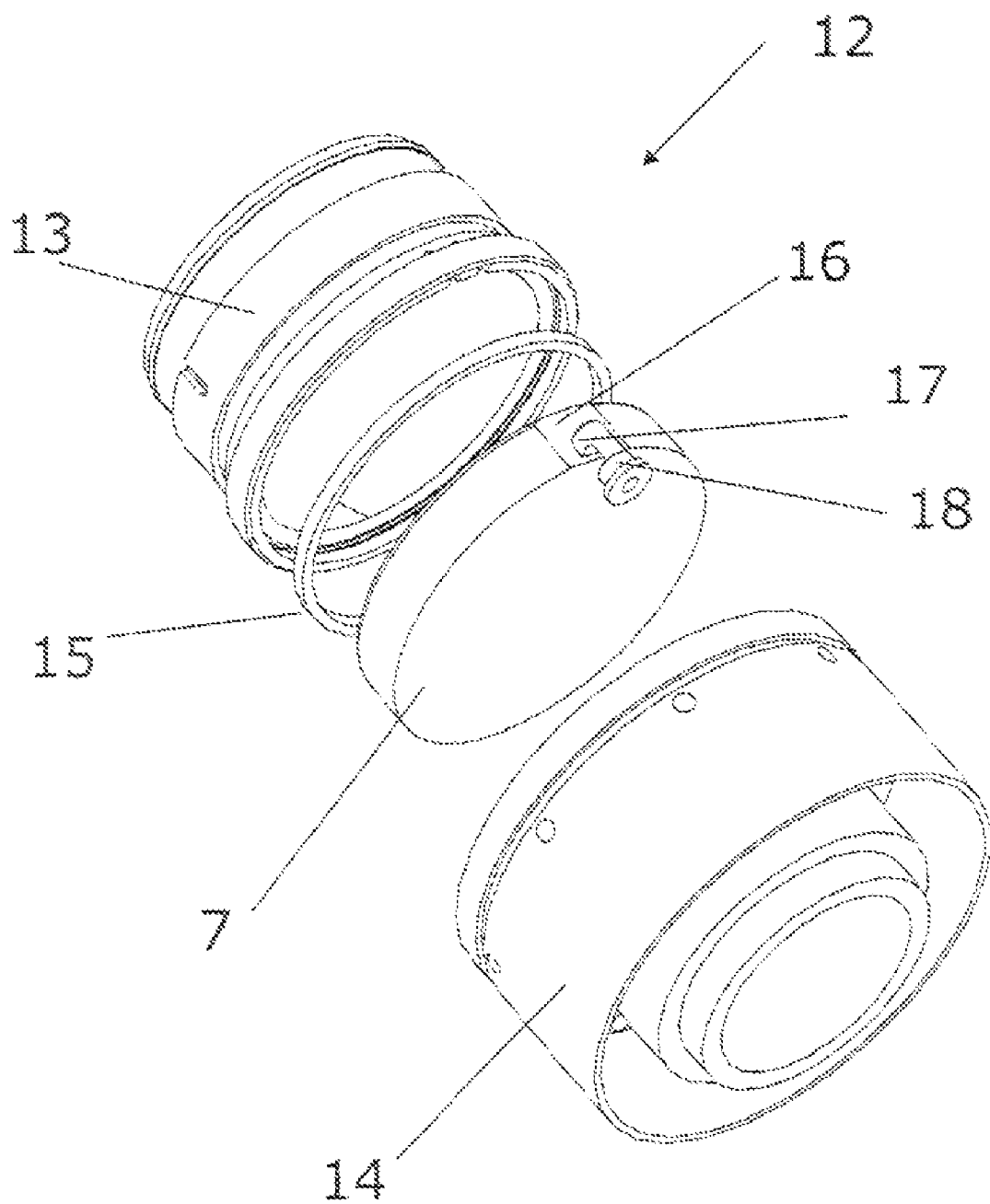
FIG. 3 is a perspective view of the assembly of the optical element holder.
Figure 4:
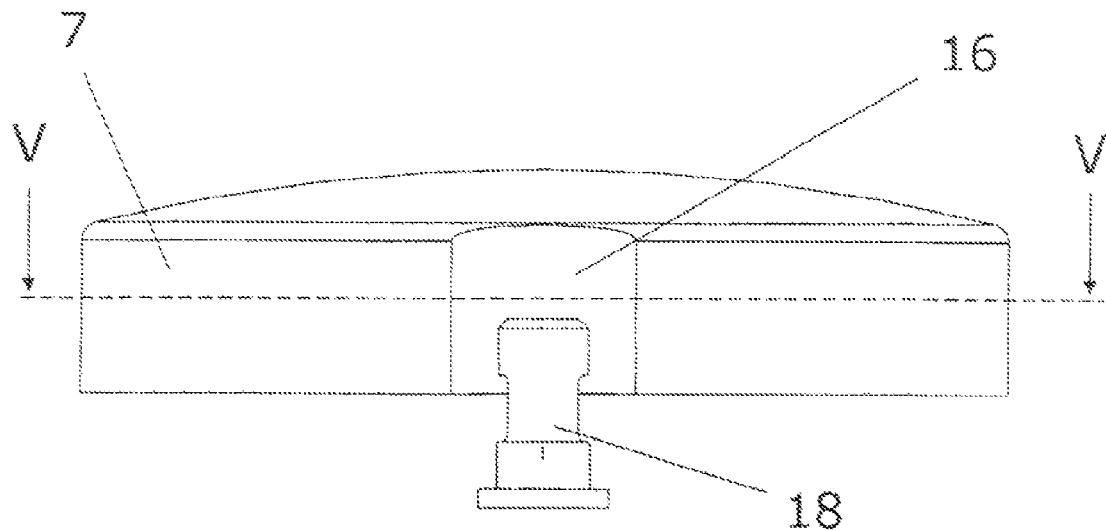
FIG. 4 is a side view of an optical element.

The assembly of a holder 12 is shown in FIG. 3. The receptacle 13 may have a concentric recess at one end in which a retaining ring 15 can be inserted and the optical element 7 can rest thereon. The optical element is circular, except for a delineated, planar surface segment 16 bounded by circular portions of the peripheral surface 16. A shoulder 17 of a clamping body 18 can be secured to the retaining device 14 and engage the delineated surface segment 16, thereby inhibiting rotation of optical element 7. This is shown more clearly in FIG. 4.

Figure 5:
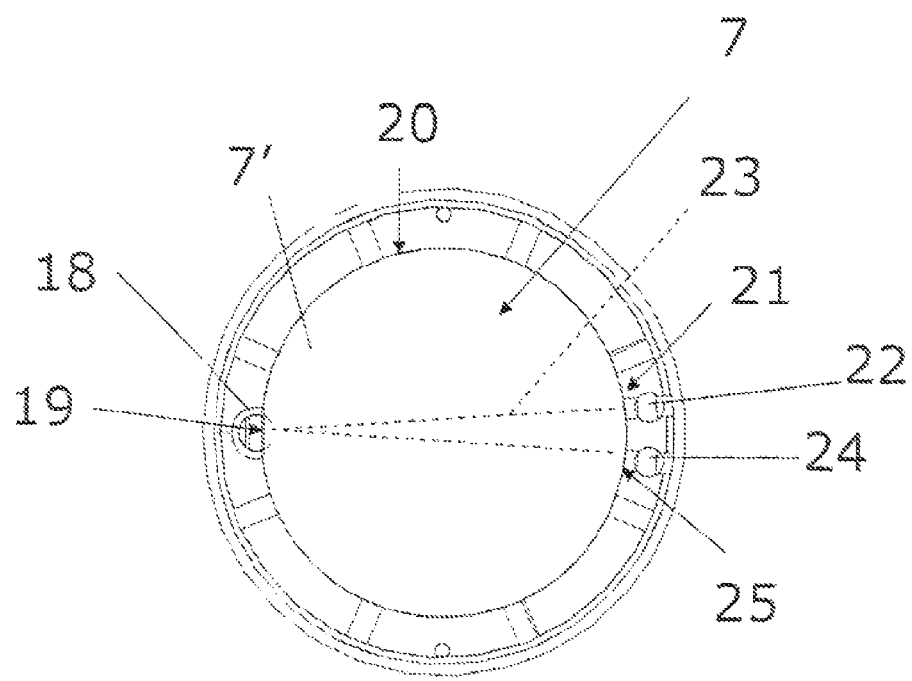
FIG. 5 is a plan view of an optical element including a monitoring device.

In some embodiments, optical element 7 may be a lens, as shown in FIG. 5. The optical element 7 has a reflecting surface 19. Reflecting surface 19 may be a delineated surface segment on the peripheral surface 20 of the optical element 7. A portion of reflecting surface 19 may be planar. The planar portion may be ground or polished. In some embodiments, reflecting surface 19 is substantially parallel to a beam axis of a laser aligned with respect to optical element 7.

In certain embodiments, a clamping body may engage reflecting surface 19 with a pressure surface to align the optical element 7 such that rotation of the optical element with respect to the optical element holder is inhibited. In some embodiments, a light-emitting diode (LED) 22 may be coupled to the optical element holder at a first position 21 of the peripheral surface 20 of the optical element 7. The LED 22 may emit a light beam 23 continuously or non-continuously (for instance, at specific time intervals) before or during operation of the laser. Light from the LED may enter volume 7' and may be reflected at the reflecting surface 19. After reflection, the light beam 23 impinges upon a photodiode 24 which is secured at a second position 25 of the peripheral surface 20 on the holder of the optical element 7. The status of the photodiode 24 may be monitored. The photodiode 24 may be used to detect the radiation heat or radiation intensity absorbed by the optical element 7 as a result of the contamination of the optical element during the laser machining. As the radiation intensity increases, the photocurrent increases. The change in the radiation intensity (change in the photocurrent compared with a reference photocurrent) may thus be used to deduce the change in the optical element 7 related to decreased performance of the optical element.

The LED 22 and the photodiode 24 may be part of a radiation measuring device integrated in the holder of the optical element. In some embodiments, the temperature of the optical element 7 may be measured by a temperature sensor positioned in the clamping body of the holder of the optical element.

It is not necessary for the delineated surface segment to be a planar surface. The delineated surface segment may be a profiled or shaped surface, such as a notch. The surface of the delineated surface segment may be ground, polished, or machined in another manner.

Figure 6:
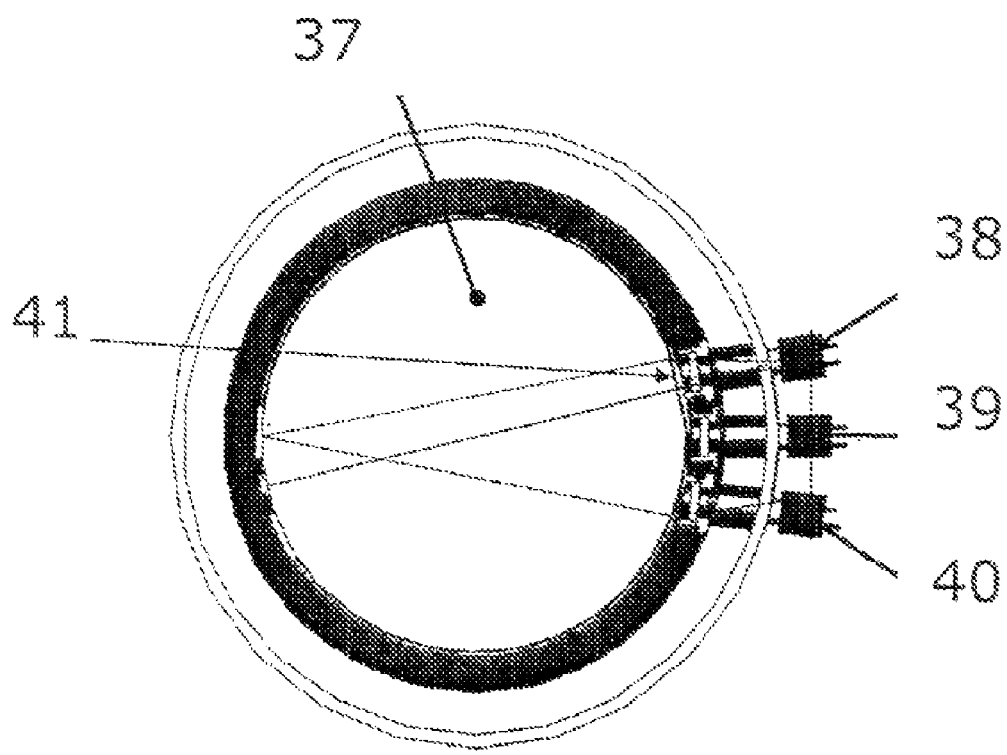
FIG. 6 is a plan view of another optical element including a monitoring device.

According to the embodiment depicted in FIG. 6, an optical element 37 has a delineated surface segment with a face 41. The delineated surface segment may facilitate orientation and installation of the optical element 37. In some embodiments, the delineated surface segment may facilitate efficient coupling of light from the LED 38 to the optical element. In some embodiments, a photodiode 39 is located on the optical element 37 for monitoring the process (laser) light. Photodiode 40 may be provided to monitor light from the LED 38.

In addition to the embodiments of the delineated surface segment on the peripheral surface of an optical element described herein, other embodiments are also feasible in which the delineated surface segment is formed on the top or bottom (that is, on a broad surface) of an optical element. The delineated surface segment may include one or more angled faces. The angled faces may be arranged at any location on the outer peripheral surface of the optical element. In addition to inhibiting rotation of an optical element in a holder, a delineated surface segment may be shaped to facilitate proper insertion of the element into the holder. For instance, a delineated surface segment with an angled face may require proper insertion of the element, such that the optical element is not inadvertently inserted upside down with respect to the incident process light.

It is to be understood that while the invention has been described in conjunction with the detailed description of multiple examples, the foregoing description is intended to illustrate and not limit the scope of the invention, which is defined by the scope of the appended claims. Other aspects, advantages, and modifications are within the scope of the following claims.

What is claimed is:

1. A laser processing machine head monitoring system comprising:

a light-transmissive focusing optical element having two broad surfaces for transmission of a processing laser beam defining a beam axis, and a peripheral surface featuring a delineated planar, angled, profiled, or shaped surface segment;

an optical element holder comprising a clamping body and defining a cavity in which the optical element is retained against rotation by interaction between the clamping body and the delineated surface segment;

a light source mounted to the holder and arranged to couple a beam of light into the optical element through the peripheral surface at a first location, through the optical element, and toward the peripheral surface at a second location;

a light receiver arranged to receive light from the light source that passes through the optical element and is internally reflected from the second location on the peripheral surface of the optical element; and a controller configured to monitor an intensity of light received from the light receiver to monitor a status of the optical element, wherein a change in intensity is used to determine a change in performance of the optical element; and wherein the delineated surface segment comprises the first location or the second location of the peripheral surface or both.

2. The laser processing machine head monitoring system of claim 1, wherein the delineated surface segment comprises the first location of the peripheral surface.

3. The laser processing machine head monitoring system of claim 1, wherein the delineated surface segment comprises the second location of the peripheral surface.

4. The laser processing machine head monitoring system of claim 1, wherein the light source is an LED, and wherein the light receiver is a photodiode.

5. The laser processing machine head monitoring system of claim 1, wherein the status of the optical element comprises a temperature of the optical element.

6. A method of monitoring focusing optical element of a laser processing machine, the method comprising:

providing the focusing optical element in a mount having a clamping body aligned with a delineated surface segment of a peripheral surface of the optical element, wherein the delineated surface segment comprises a planar, angled, profiled, or shaped segment of the peripheral surface that is configured to enable interaction with the clamping body to retain the optical element against rotation;

coupling a light beam into a first location of the peripheral surface, through the optical element, to a second location of the peripheral surface, wherein the delineated surface segment comprises the first location or the second location of the peripheral surface or both; and monitoring an intensity of the light beam reflected internally from the second location of the peripheral surface to determine a status of the optical element, wherein a change in intensity is used to determine a change in performance of the optical element.

7. The method of claim 6, wherein the delineated surface segment comprises the first location of the peripheral surface.

8. The method of claim 6, wherein the delineated surface segment comprises the second location of the peripheral surface.

9. The method of claim 6, wherein coupling the light beam occurs continuously during operation of the laser processing machine.

10. The method of claim 6, wherein coupling the light beam occurs non-continuously during operation of the laser processing machine.

* * * * *